W. R. REECE.
Car Wheel.
No. 52,603. Patented Feb. 13, 1866.
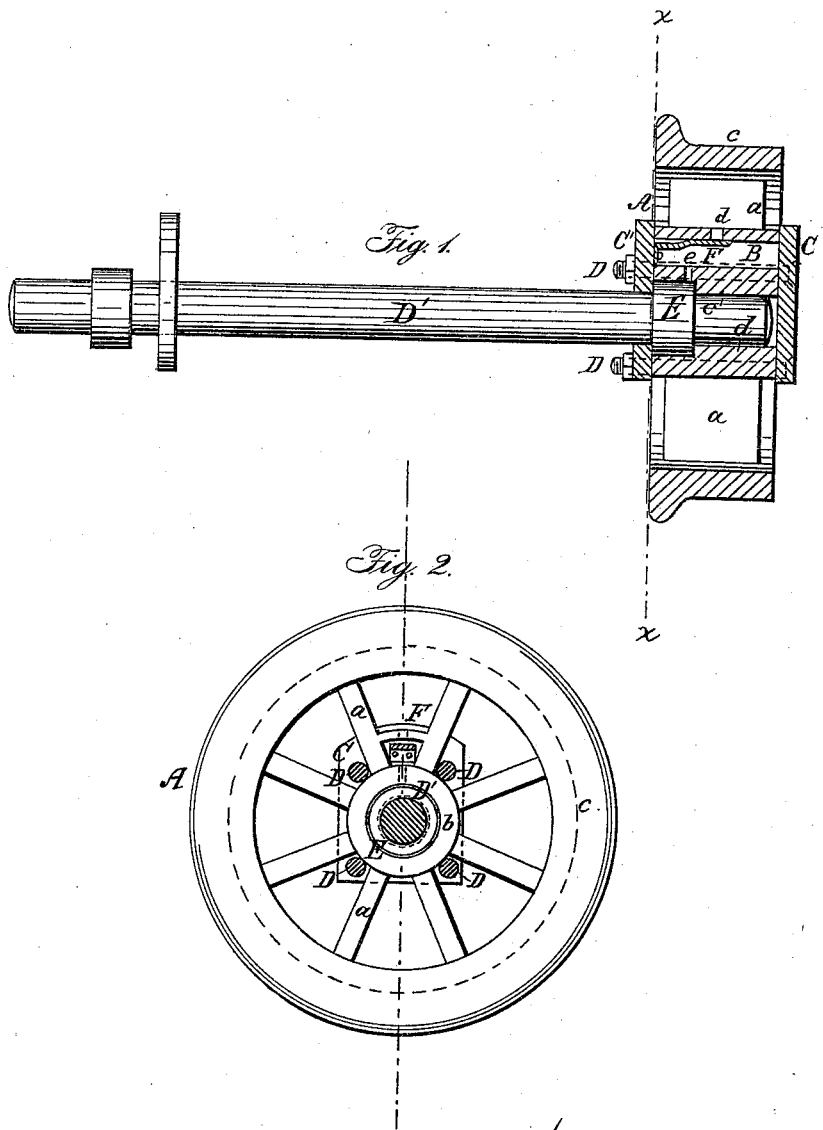

UNITED STATES PATENT OFFICE.

WILLIAM R. REECE, OF TREMONT, PENNSYLVANIA.

IMPROVED METHOD OF ATTACHING AND LUBRICATING CAR-WHEELS.

Specification forming part of Letters Patent No. 52,603, dated February 13, 1866.

*To all whom it may concern:*

Be it known that I, WILLIAM R. REECE, of Tremont, in the county of Schuylkill and State of Pennsylvania, have invented a new and Improved Mode of Attaching Car-Wheels to their Axles and Lubricating the Same; and I do hereby declare that the following is a full, clear, and exact description thereof, which will enable those skilled in the art to make and use the same, reference being had to the accompanying drawings, forming part of this specification, in which—

Figure 1 is a central section of a car-wheel applied to its axle according to my invention; Fig. 2, a side sectional view of the same, taken in the line $x$ $x$, Fig. 1.

Similar letters of reference indicate corresponding parts.

This invention relates to a new and useful improvement in attaching car-wheels to their axles with a view of keeping the same in a properly-lubricated state, and prevent the admission of dirt, dust, &c., within the hub of the wheels.

A represents a car-wheel which in this case is represented as being formed or cast with spokes $a$, a hub, $b$, and a rim, $c$. Between two of the spokes of the wheel and adjoining the hub $b$ there is a chamber, B, which serves as an oil-chamber. This oil-chamber is open at both ends, and is cast with the wheel.

The open ends of this oil-chamber are closed by two plates, C C', which are connected and clamped firmly to the ends of the oil-chamber by screw-bolts D, the outer plate, C, covering the end of the hub $b$ of the wheel, and the inner plate, C', having a circular opening made in it for the axle D' to pass through.

Within the hub $b$ there is a recess, $c'$, to receive a collar, E, on the axle, said collar and the inner plate, C', securing the wheel on the axle, as will be fully understood by referring to Fig. 1.

It will be seen from the above description that one of the collars E on the axle must either be removable or cast on the axle after the two inner plates, C', are placed on it, otherwise said plates could not be fitted on the axle.

The oil-chamber B has an opening, $d$, made in its outer side, through which said chamber is supplied with oil, and this opening is closed by a spring, F, attached to the inner plate, C'. In filling the chamber B the spring F is pressed down by a rod or wire in order to admit the oil into the chamber.

The hub $b$ within the chamber has an opening, $e$, made in it to form a communication between B and the portion of the axle within the hub, and admit oil from said chamber to the portion of the axle within the hub. By this simple arrangement the axle will always be kept perfectly lubricated and free from dust or dirt. The oil is never allowed to flow so copiously upon the axle as to pass out through the inner plate, C', around the axle, but is very gradually supplied about as required.

This invention is more especially designed for coal-cars in mines, the present mode of lubricating the axles of said cars being very imperfect, the oil being allowed to escape from the axle and leave the latter quite dry if not very frequently oiled, which causes a great expenditure of oil.

Having thus described my invention, I claim as new and desire to secure by Letters Patent—

1. The oil-chamber B in the wheel A, closed at its ends by plates C C', which are connected by bolts D, and arranged, as shown, so as to secure the wheel on the axle, a communication being formed between the chamber B and the interior of the wheel-hub $b$, and all arranged substantially as and for the purpose specified.

2. The spring F, applied to the opening $d$ in the oil-chamber B, substantially as and for the purpose set forth.

WILLIAM R. REECE.

Witnesses:
 CHARLES LONG,
 ADAM FERG.